United States Patent [19]

Heider

[11] Patent Number: 5,276,863

[45] Date of Patent: Jan. 4, 1994

[54] COMPUTER SYSTEM CONSOLE

[75] Inventor: Gerhard K. Heider, Le Rouret, France

[73] Assignee: Digital Equipment Corporation, Maynard, Mass.

[21] Appl. No.: 723,228

[22] Filed: Jun. 28, 1991

[51] Int. Cl.$^5$ .................................................. G06F 11/00
[52] U.S. Cl. ............................. 395/575; 364/DIG. 1; 364/285; 364/264; 364/267; 364/268.9; 364/265; 364/285.3; 371/16.1
[58] Field of Search ............... 395/700, 725, 750, 575; 371/16.1, 16.5, 17

[56] References Cited

U.S. PATENT DOCUMENTS

| | | | |
|---|---|---|---|
| 4,305,125 | 12/1981 | Sato et al. | 395/575 |
| 4,807,186 | 2/1989 | Ohnishi et al. | 371/26.5 |
| 4,851,994 | 7/1989 | Toda et al. | 395/275 |
| 4,868,783 | 9/1989 | Anderson et al. | 395/325 |
| 4,870,644 | 9/1989 | Sherry et al. | 371/16.1 |
| 4,970,640 | 11/1990 | Beardsley et al. | 395/725 |
| 5,128,995 | 7/1992 | Arnold et al. | 380/4 |
| 5,136,713 | 8/1992 | Bealkowski et al. | 395/700 |

*Primary Examiner*—Debra A. Chun
*Attorney, Agent, or Firm*—Barry N. Young; Ronald C. Hudgens

[57] ABSTRACT

A process for providing access to the console functionality of a computer system in response to console function requests. A console server computer system and a console client computer system are in a network, and console functions requests are included in data packets transmitted from the console client to the console server on a standard network interconnection. A console server computer system operating in an ON state is able to interrupt access to the operating system in response to the receipt of a data packet including a remote reset request, and can respond to console function requests without entering the console state.

43 Claims, 3 Drawing Sheets

FIG. 1

COMPUTER SYSTEM CONSOLE

FIELD OF THE INVENTION

The invention relates to computer system consoles that perform functions without accessing an operating system.

BACKGROUND OF THE INVENTION

In computer systems, a number of different levels of system functionality must be provided.

The highest degree of functionality, hereinafter referred to as ON functionality, is obtained when the operating system for the computer has been loaded. At times when the operating system is running and accessible, application programs layered on top of the operating system can be executed. It is expected that the computer system will be operating in this state, hereinafter referred to as the ON state, the vast majority of time.

An intermediate level of functionality is provided at times when the operating system is not being accessed. This degree of functionality will hereinafter be referred to as console functionality.

When the console functionality of the computer system is being utilized, it is possible to perform a number of operations related to the management, maintenance, and/or debug of the computer system. For example, console functionality allows the user to load and run code that does not require access to the operating system. Therefore, standalone diagnostic programs can be executed.

At times when the computer system cannot access the operating system without first booting up the operating system, the computer system is in a state that will be referred to as console state. At a minimum, the computer system hardware and software that is operational in console state must be sufficient to allow the user to bootstrap load the operating system.

Finally, the lowest degree of computer system functionality, hereinafter referred to as front panel functionality, is supplied by hardware and software that enable the system to provide console functionality. At a minimum, front panel functionality is required in order to power up the system.

Front panel functionality also may include certain basic management, maintenance, and debug operations. For example, hardware and software may be provided to determine whether there are faults in the computer system that prevent the use of console functionality. The computer system also may contain switches or flags that are set by the user (or preset by the manufacturer) in order to select among a number of options, including options relating to system behavior during initialization or relating to security measures to limit access to console functionality. This option selection is generally implemented in larger computer systems by physically setting a number of switches located on a front panel, and in smaller computer systems by setting a number of flag bits in devices such as EEPROMs.

Console functionality can be implemented in a number of different ways. In some computer systems, such as the MicroVAX, a single microprocessor is used to execute instructions that provide console functionality at some times and also to execute instructions that provide ON functionality at other times. In these systems, a ROM is provided that has memory addresses which are reserved for the storage of console code and which are separate from the memory addresses used to store code that is executed at times when the operating system is being accessed.

In other computer systems, such as the Digital VAX 8600 and VAX 8800, console functionality is provided by a console subsystem that is relatively independent from the hardware and software used to provide ON functionality. In these systems, a separate microprocessor that does not access the operating system is used to execute console code at all times, and may be housed in a separate cabinet from the main processor. The console subsystem also may include its own main memory, mass storage devices, and video terminal.

Unfortunately, in existing computer systems that provide management, maintenance, and/or debugging capabilities, there are problems and inefficiencies in the ways in which console functionality is implemented.

One of the main problems with existing implementations is the inability to access the console functionality of a computer system from a remote location. Traditionally, console code, which is executed without accessing the operating system, has only been available to users with local access to the computer system.

In existing console subsystems, a local interface may be used that is not well-suited for remote access. Local access to the console functionality of a computer system typically is provided by a human interface in the form of selectable switches, indicator lights, and/or text that is input via a keyboard and output via a CRT monitor. Text-based input/output is unsuitable for transfers between remote locations on a standard network interconnection for a number of reasons: (1) It is difficult for a program to parse text that is intended for human interpretation; (2) Human-readable text is not an efficient information transfer mechanism; and (3) Character-oriented input/output is not an efficient means of information transfer.

In some console subsystems, the consoles associated with a number of computer systems in a network may be coupled to each other. However, the communication between these consoles is completely separate and independent from the communication between the computer systems over the network.

In these console subsystems, the standard network interconnection cannot be used to access the console functionality of a computer system from a remote location. Instead, a separate link is set up that is dedicated to communication between the consoles, and a special interface has to be included in these consoles. As a result, existing hardware and software for providing the interface between a computer system and a standard network interconnection cannot be used to implement the interface required for console-to-console communication.

Typically, communication by a computer system over a standard network interconnection is accomplished by network support hardware and software. Generally, this network support hardware and software operates by accessing the operating system of the computer system. Therefore, the management of distributed computer systems in a network from a remote location may be difficult at times when those systems are not accessing or cannot access their operating systems.

For example, if a hardware or software fault prevents a computer system from using its operating system, maintenance and/or debug of the system may have to be performed locally. As a result, users at each computer system site in the network may need standalone diagnostic programs that are sufficient to independently maintain and/or debug each of their own systems.

Furthermore, it may be necessary for users at each computer system site to have considerable expertise in the isolation of and recovery from faults. Otherwise, whenever one of the computer systems fails, i.e., "hangs up" or "crashes," trained field service personnel would have to be sent to that computer system site in order to diagnose any problems.

As a result of this inability to access the console functionality of a computer system from a remote location, one computer system in a network cannot use a standard network interconnection to, for example, force the hardware and software in another node to bootstrap load its operating system, or to load and execute a standalone diagnostic program. However, there is a need to have the capability of using the standard network interconnection to reboot an operating system into a remote computer system without physically visiting that computer system.

For example, if one computer system in a network is in an unknown state as a result of a system hang up or crash, it may be desirable to send over the standard network interconnection, from a console "client" at a remote location, a request that the malfunctioning computer system reboot the operating system. In this way, the malfunctioning computer system is forced into a known state.

The lack of remote access to console functionality also prevents implementation of other performance and efficiency improvements. For example, it is not efficient to provide a dedicated group of resources coupled to the standard network interconnection for touring the computer systems in the network on a periodic basis for the purpose of understanding the status of those systems in which the operating systems are not booted up and running.

If remote access to console functionality over the standard network interconnection were made available, console functionality could be implemented by performing many of the required console operations in a special-purpose computer system in the network, referred to as a console concentrator. The console concentrator would act as a console client and send requests for performance of console functions over the standard network interconnection. The other computer systems in the network would act as console "servers" that perform console functions in response to requests made by console clients.

Several advantages may be gained if the execution of many console operations is concentrated in one of the computer systems in a network. The computer system acting as the console concentrator can be adapted to include hardware and software especially designed for the management, maintenance, and/or debugging of other computer systems in the network. For example, artificial intelligence and/or expert systems could be incorporated in the console concentrator in order to diagnose problems occurring in other computer systems.

As a result, operators and/or service personnel at the console concentrator may be provided with a clearer picture of the status of other computer systems in the network. Additionally, it may be easier to protect the confidentiality of the hardware and software used to manage, maintain, and debug computer systems if the diagnostic programs are completely or partially stored and/or executed at the console concentrator.

Furthermore, if many console operations are performed by a sophisticated concentrator acting as a console client, the hardware and software in the concentrator may be updated to take into account the requirements of various computer systems coupled to the network as the features incorporated in those systems change. It may be beneficial to provide a single point in a network at which multiple computer systems can be managed. Such an approach may eliminate any need to separately upgrade a number of computer systems when revisions are made in the computer systems themselves or in the procedures used for management, maintenance, and debugging.

At present, each time a new processor is developed, it often becomes necessary to organize a dedicated console development team to design the console associated with that processor. However, it is wasteful to duplicate previous development efforts by recreating higher level functions related to console functionality, such as command processing, that have already been implemented in existing computer systems.

Correspondingly, if more complicated tasks are handled by a console concentrator, then the amount of hardware and software dedicated to execution of tasks related to console operations can be reduced in other computer systems in the network, which act as the console servers. Without a console concentrator, sufficient hardware and software may have to be distributed throughout the network to enable each system in the network to independently perform all operations necessary in order to support software that can effectively manage, maintain, and debug that computer system.

The division of tasks between a computer system functioning as a console client and other computer systems functioning as console servers would permit simplification and standardization of the console functionality implemented in the console server computer systems. As a result, when a new computer system is being developed, the amount of console functionality that must be included in that computer system can be minimized, making the development effort simpler.

Simplification of the console functionality provided by the console server computer systems in a network also may reduce the number and complexity of consoles that are required. The shifting of tasks to a computer system that functions as the console client may eliminate the need to provide certain console server computer systems with console subsystems that are located in separate cabinets and that have their own dedicated video terminals. Furthermore, simplification should make development efforts easier and faster. As a result, the cost of providing the console server computer systems may be reduced, and floor space requirements for these computer systems also may decrease.

Standardization of the console functionality provided by console server computer systems may reduce the variety of consoles that are required. Currently, there are inconsistencies in the interfaces provided by various consoles to users, thereby increasing the amount of training that is required for users and field service personnel. Furthermore, consoles may differ from each other in command processing, data presentation, and the effect of particular commands. As a result, a number of operator-induced errors occur, and errors may occur during the management and maintenance of the computer system.

Additional problems with existing console subsystems arise as a result of the automatic transition of a computer system from an ON state to a console state.

Presently, when a request for access to console functionality is provided, the computer system changes to the console state. Therefore, in order to access the operating system again after entering the console state, the operating system may have to be rebooted.

However, it is inefficient to force a reboot of the operating system after each grant of access to console functionality. In some circumstances, the processor may be able to continue its operations after executing certain console functions. Therefore, there is a need for a system in which access to the operating system may be interrupted in response to a console function request when a computer system is in the ON state, and subsequently restarted after access to console functionality has been provided.

SUMMARY OF THE INVENTION

It is an object of the invention to overcome at least some of the problems associated with the prior art.

It is therefore desirable to provide an improved method for providing access to the console functionality of a computer system in response to console function requests. It would be beneficial to provide a process in which a console server computer system and a console client computer system are in a network, and in which console functions requests are included in data packets transmitted on a standard network interconnection.

Preferably, a console server computer system operating in the ON state should be able to respond to console function requests without entering the console state. In addition, it would be advantageous if the computer system in the ON state is able to interrupt access to the operating system in response to the receipt of a data packet including a remote reset request.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

To achieve the objects and in accordance with the purposes of the invention, as embodied and broadly described herein, a process is provided for providing access to the console functionality of a computer system in response to console function request. The process includes the steps of switching the computer system from an off state to a console state; bootstrap loading the operating system of the computer system when the computer system is in the console state to switch the computer system to an ON state; accessing the operating system when the computer system is in the ON state; switching the computer system from the ON state to the console state at times when the computer system is prevented from accessing the operating system without bootstrap loading the operating system; providing a console function request to request execution of a specified console function; and executing the specified console function, without accessing the operating system, at times when the computer system is in the console state and at times when the computer system is in the ON state, in response to the providing of the console function request.

The accompanying drawings, which are incorporated in and constitute a part of this specification, illustrate preferred embodiments of the invention and, together with the description of the invention, explain the principles of the invention.

DESCRIPTION OF THE PREFERRED EMBODIMENT

Reference will now be made in detail to a presently preferred embodiment of the invention, an example of which is illustrated in the accompanying drawings.

Figure 1:
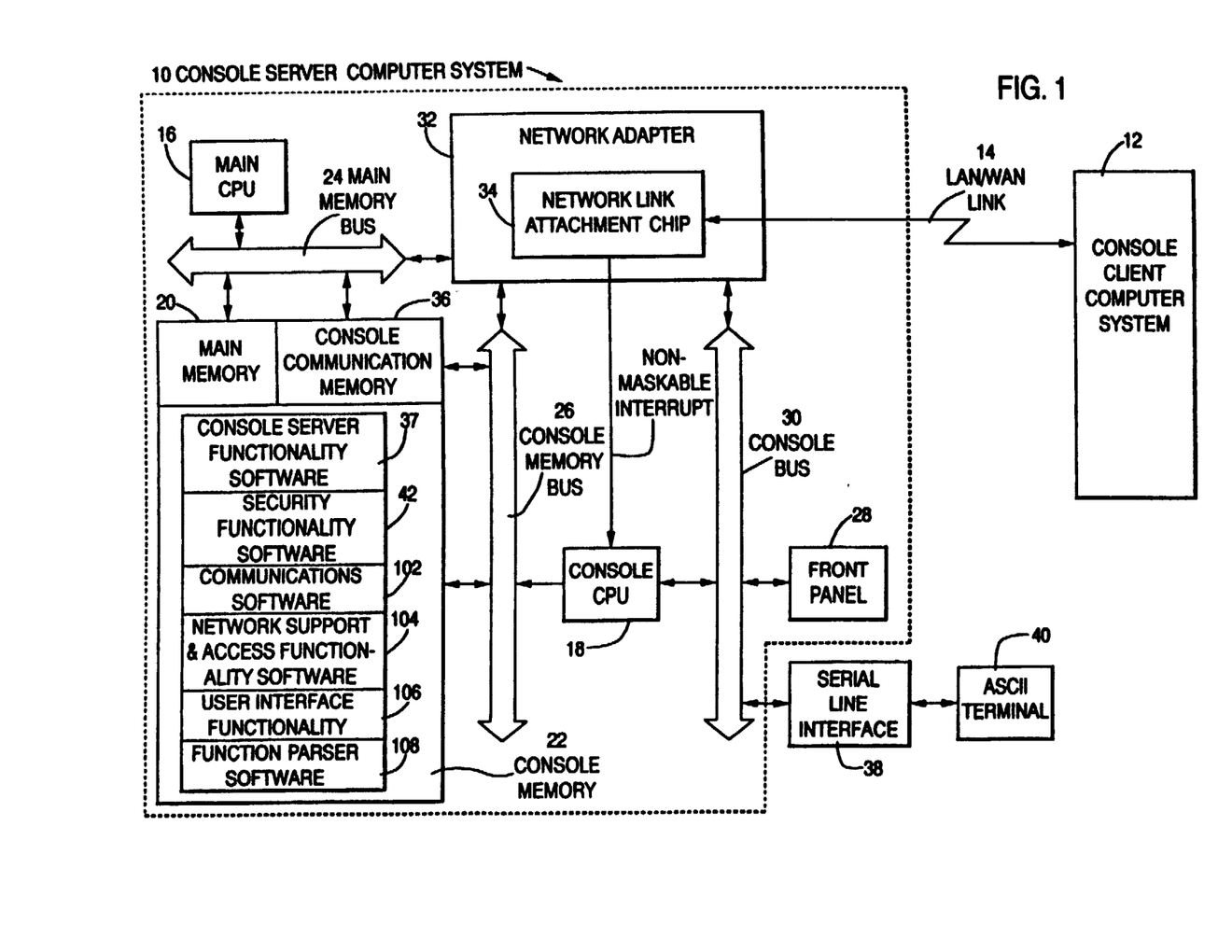
FIG. 1 is a block diagram of a preferred embodiment of a computer system which practices the present invention.

A preferred embodiment of a data processing system is shown in FIG. 1. The data processing system includes a console server computer system, which is represented generally by the numeral 10. Console server computer system 10 is in a network that includes a console client computer system 12. Both console server computer system 10 and the console client computer system 12 are coupled to a standard network interconnection for transferring data packets among a number of computer systems. As embodied in FIG. 1, the standard network interconnection is provided by LAN/WAN link 14.

As embodied in FIG. 1, console server computer system 10 includes a main CPU 16 and a console CPU 18. Main CPU 16 executes the code stored in a main memory 20. Typically, the software stored in main memory 20 includes the operating system and applications programs layered on top of the operating system. Console CPU 18 executes console code, which is stored in a console memory 22. Preferably, console memory 22 is implemented using nonvolatile memory, such as ROM. In this preferred embodiment, a main memory bus 24 and a console memory bus 26 respectively couple CPU 16 to memory 20 and CPU 18 to memory 22.

In console server computer system 10, the enabling (e.g., power-up) of the hardware, and the loading and execution of certain software, i.e., the console code, provide console functionality. This console functionality can then be used to load or boot an operating system to provide ON functionality. Boot parameters are used to specify the initial state of the computer system after the operating system is loaded.

In console server computer system 10, there are three layers of functionality with different attributes and identifiable boundaries. In accordance with the invention, the computer system may be switched from an off state to a console state. Front panel functionality is that functionality which is required to propel the computer system to a state in which console functionality is available.

In addition to powering up the system, it is preferable for the front panel functionality to include hardware and/or software that provides information useful to the user in discovering and isolating faults that may prevent the computer system from accessing console functionality from an off state. As shown in FIG. 1, console server computer system 10 includes a front panel 28 that may contain hardware switches, indicator lights, and nonvolatile memory. Front panel 28 is connected to console CPU 18 by a console bus 30.

When the computer system is in the off state, the functionality of the computer system is not accessible via the operating system, via a network, or via a local user interface. Typically, a computer system is in the off state when the computer system is powered off or when there is a fault that prevents access to console functionality and to ON functionality. The only management, maintenance, or debugging of the computer system that is possible requires physical access to the computer system.

For example, in the off state the user can set hardware switches on front panel 28 to start the system, such as a Power On/Off switch. The user also can view indicator lights on front panel 28 to determine whether a fault has occurred. The lowest level of management information is provided by a Power OK indicator to verify proper functioning of the power system. In addition, one or more Fault indicators are present on front panel 28 to indicate and isolate faults that are preventing the computer system from accessing console functionality.

In a preferred embodiment of the invention, the front panel functionality also is used to select initialization behavior of a computer system or to select basic security measures.

A Restart On/Off switch on front panel 28 can be set locally to determine the computer system behavior after a power failure or after other interruptions in the running of the operating system. When the Restart switch is set to On, the computer system attempts to continue (restart) the running of the operating system without rebooting (to remain in the ON state). Otherwise, the computer system enters the console state and must reboot the operating system in order to enter the ON state.

A Halt/Reboot switch on front panel 28 also can be set locally to determine the initialization behavior at times when running of the operating system cannot be restarted. When the Halt/Reboot switch is set to Halt, the computer system enters and remains in the console state. When the Halt/Reboot switch is set to Reboot, the computer system attempts to reboot the operating system to enter the ON state.

In accordance with the invention, the computer system can bootstrap load the operating system of the computer system when the computer system is in the console state to switch the computer system to an ON state. When the computer system is in the console state, the computer system cannot access the operating system without booting the operating system. However, the computer system can execute code, such as standalone diagnostics, that does not require access to the operating system. The computer system also is considered t be in console state during transitions when the operating system is being booted or the computer system is crashing.

Console functionality is that functionality which is required to cause the computer system to enter a state in which ON functionality is available, i.e., it includes the hardware and software necessary to boot the operating system, and also includes the hardware and software required, after an interruption in running of the operating system, to restart or continue running of the operating system without rebooting. Preferably, console functionality also includes all functionality that is required for the management, maintenance, and debug of the computer system at times when the computer system is not up and operating. Console functionality is available when the computer system is in the ON state by interrupting access to the operating system.

In accordance with the invention, at times when the computer system is either in the console state or the ON state, the computer system executes a specified console function in response to a console function request. In the embodiment of the invention shown in FIG. 1, console functionality is primarily provided by console CPU 18 executing console code stored in console memory 22. Memory 22 contains console server functionality software 37, which contains the code that enables console CPU 18 to perform the specified console functions.

In accordance with the invention, a console function console function. Preferably, console server functionality software 37 contains microcode that enables console CPU 18 to perform a basic set of console functions, such as bootstrap the operating system, examine and deposit data in registers and in memory, run stand-alone programs without use of the operating system, single step through microcode, start and stop main CPU 16, and test the hardware with self-test microcode and macrodiagnostic programs.

In the present invention, when the computer system is in the ON state, the operating system can be accessed. ON functionality is that functionality which is available after booting of the operating system, i.e., when the operating system is running and accessible. However, ON functionality can be interrupted by the execution of console functionality even though the computer system remains in the ON state. As embodied herein, the operating system is accessed in console server computer system 10 by main CPU 16 executing instructions stored in main memory 20.

Partitioning console functionality among console server computer systems and console client computer systems presents opportunities to solve certain problems. For example, product-dependent console functionality can be split from product-independent console functionality. Product-dependent functionality is referred to as console server functionality and is located in the product, i.e., the console server computer system. Product-independent console functionality is referred to as console client functionality and can be located outside the product by, for example, incorporating it into the console client computer system. Product-dependent or console server functionality should represent only about 15% of all console functionality.

Basic console functionality can be split from extra console functionality that provides important but non-essential features that add value on top of the basic product-dependent console functionality. The extra console functionality can be implemented in a sophisticated console client computer system, i.e., a console concentrator. Furthermore, the interface between these two groups of functionality, i.e., console server functionality and console client functionality, can be identified and specified as a communications interface between console server computer system 10 and console server computer system 12.

As a result of this split in functionality, the console functionality which needs to be colocated with the customer product, i.e., the console server computer system, is minimized, and the development of hardware and software to support this reduced level of functionality is more feasible because the solution is relatively small and inexpensive. Furthermore, the development effort for new console server computer systems is transformed. Instead of having to reimplement the product-independent console functionality that is remotely located in the console client computer system, the development effort for the new product focuses on the specific requirements of the product and on providing a console server interface that communicates with the console client computer system to provide access to its ON functionality and console functionality.

Furthermore, most of the console server functionality would be reusable in other products, making it possible to rely on a single common platform to supply basic console server functionality in console server computer systems. If additional features are desirable due to the requirements of a particular product, these features can be implemented in specific products by simply extending the number of available functions when console server functionality is accessed. Thus, console server functionality can be split into a basic set of functions that is always required, and into a set of extra functions that go beyond the basic set but which are useful in specific products.

The implementation of product-independent console client functionality in a console client computer system, which can communicate with console server computer systems over a network, makes it feasible and economical to develop more advanced console capabilities. Furthermore, this split in functionality facilitates the concentration of console operations in the console client computer system, which can function as a remote management tool. In addition, the console client computer system may be able to mask any differences resulting from specific requirements of various products and vendors (e.g., the boot of a SUN workstation may look to the user exactly the same as the boot of a Digital computer system, and therefore would not require intervention by the console user).

Furthermore, the interface between a console client computer system and a console server computer system can be specified to comply with the requirements for communication over the standard network interconnection of a network, such as LAN/WAN link 14 coupled to console server computer system 10 and console client computer system 12. As a result, complete remote access to basic, product-dependent console server functionality is obtained, and network access to console client and console server functionality can be implemented.

Important advantages are obtained when the console functionality in a console server computer system is integrated together with network support functionality to assure network access to remote console client functionality. In this way, the standard network interconnection for a product can be used to manage, maintain, and debug the product when its operating system is not running.

The interface between the console server functionality and the network support functionality in the console server computer system is defined and standardized. In this way, the product-dependent console server functionality in different products can all utilize existing network support adapters because the interface will be unchanged. Furthermore, there is flexibility in product implementation because the interface between the console server functionality and the network support hardware and software corresponding to a particular type of network will be the same regardless of the architecture of the product. In addition, the network support functionality may be colocated with the console server functionality or can reside in a separate network adapter.

Thus, in accordance with a preferred embodiment of the invention, a console server computer system is used to provide console functionality in response to console function requests, and a console client computer system is used to manage the console server computer system by accessing the console functionality of the console server computer system. Each computer system is coupled to a standard network interconnection to receive data packets transferred on the network. Therefore, an additional and separate link exclusively dedicated to console access is unnecessary, and use of the standard network interconnection increases the ability to access console functionality from a remote location, to concentrate product-independent console functionality in a console client computer system, and to utilize sophisticated management and diagnostic tools.

Preferably, console server computer system 10 includes a network adapter 32 to implement network attachment to LAN/WAN link 14. Network adapter 32 communicates with console CPU 18 via console bus 30, and communicates with main memory 20 and console memory 22 via main memory bus 24 and console memory bus 26. A network link attachment chip 34 is contained in network adapter 32, and it transfers data blocks via DMA directly between the network and memories 20 and 22. As embodied herein, remote access to console functionality is achieved using standard network components that operate in accordance with existing standards.

In some embodiments of the invention, certain console server computer systems (nodes) on a network may contain multiple consoles, which are implemented using primary console server functionality corresponding to one of the consoles and secondary server functionality for each of the other consoles. In these multiple console computer systems, only one of the consoles, i.e., the one associated with the primary console server functionality, has direct access to the standard network interconnection. However, console client computer systems can access the secondary console server functionality in the other consoles via the primary console server functionality.

In order to change the state of a computer system between the console state and the ON state, a handshake is require between the console functionality and the ON functionality. In accordance with the invention, a computer system is switched from the ON state to the console state at times when the computer system is prevented from accessing the operating system without bootstrap loading the operating system.

It is important to define the required handshake and interface between the console functionality and the ON functionality of a computer system during transitions between console state and ON state. In this way, standardization and interchangeability of future console implementations is ensured, because the interface accessible to the operating system and the interface accessible to the console will appear the same regardless of the architecture of the underlying product.

In the preferred embodiment of the invention shown in FIG. 1, the interface between console functionality and ON functionality is principally supplied by a console communication memory 36, which is a shared memory accessible by main CPU 16 and also by console CPU 18. Preferably, storage locations that are accessible both to the ON functionality and the console functionality of the computer system are provided that contain data indicating the state of the computer system. For example, memory 36 may include a number of flags that are set by main CPU 16 and console CPU 18 in order to perform a handshake necessary to change the state of the computer system.

The required interface between the console functionality and the ON functionality masks any dissimilarities between console implementations in which the number of CPU's differs. The same handshake sequences for transitions between console state and ON state are observed by the user whether the computer system contains multiple CPU's (e.g., console server computer system 10) so that access to some console functionality and some ON functionality may be available at the same time, or contains only one CPU which must execute either console functionality or ON functionality.

Preferably, console server computer system 10 is in console state until such time that ON functionality requests a change to ON state, provided the console functionality agrees to the change. As embodied herein, console communication memory 36 includes an On State Flag. The On State Flag is accessible by main CPU 16 and console CPU 18, and is used for communication between the hardware and software dedicated to providing ON functionality and the hardware and software dedicated to providing console functionality. The On State Flag also can be used to control other related actions, such as switching of the path used to access console functionality.

The On State Flag in console communication memory 36 is used for the handshaking between the ON functionality and the console functionality in console server computer system 10. The console functionality in the computer system boots the operating system. When the operating system is loaded, the ON functionality in the computer system requests a switch to the ON state. The computer system will enter the ON state and the On State Flag will be set unless the console functionality in the computer system is executing a console function that prevents a switch of the computer system to the ON state.

In one aspect of the present invention, access to the operating system may be interrupted, in response to the providing of a console function request when a computer system is in the ON state, to access the console functionality of the computer system. However, access to the operating system may be continued without bootstrap loading the operating system, after interrupting access to the operating system, and after the computer system executes a specified console function in response to the providing of a console function request when the computer system is in the ON state.

In a preferred embodiment, some of the functionality which is available when the computer system is in the console state also is available when the computer system is in the ON state. This results because certain basic functionality needs to be accessible by the computer system at all times. This basic functionality, which can be accessed either in console state or in ON state, may be implemented as console functionality that can be used (e.g., by providing callable console routines) by the ON functionality in the computer system, or can be implemented independently from the console functionality as part of the operating system.

Preferably, after a computer system in the ON state interrupts access to the operating system and executes a specified console function, the computer system determines whether access to the operating system can be continued without bootstrap loading the operating system. Usage of certain console functionality when the computer system is in the ON state may prevent the ON state from continuing, i.e., when running of the operating system cannot be restarted without error. For example, all of the data accessible by the ON functionality may not have been saved, requiring a reboot if any of the data is altered as a result of execution of a specified console function.

Therefore, in the present invention, the computer system may switch from the ON state to the console state at times when it is determined that access to the operating system cannot be continued without bootstrap loading the operating system. Accordingly, the computer system transitions to console state, and the ON State Flag indicates the change in state.

At times when access to the operating system is interrupted to provide access to console functionality when a computer system is in the ON state, a timeout value may be generated by the computer system to specify a timeout period during which access to the operating system can be continued. The computer system is switched from the ON state to the console state in response to the timeout period expiring prior to the continuing of access to the operating system. In a preferred embodiment of console server computer system 10, the timeout value is supplied by the ON functionality to the console functionality by having main CPU 16 write the timeout value in a specific address in console communication memory 36.

Preferably, prior to expiration of the timeout period, an indication is provided that the computer system will switch from the ON state to the console state. As embodied herein, the console functionality provides a warning to the user about the imminent change from ON state to console state. In accordance with an embodiment of the invention, a continue command can be provided to prevent switching of the computer system from the ON state to the console state. In this way, the user decides whether to allow the computer system to be restarted without rebooting the operating system, or whether to interfere with normal system operation.

The same warning from the console functionality, and request for confirmation by the user, also may be given when a specified console function is requested which, if executed by the console functionality, would force the computer system to change from the ON state to the console state. Thus, the console functionality is able to perform checks of timeout values and of console function requests in order to allow the user to avoid changing the state of the computer system.

When access to the operating system is interrupted, the context of the ON state is saved so that the computer system can subsequently resume performing any tasks that were interrupted. However, execution of a specified console function by the console functionality may affect the ability of the computer system to continue in the ON state, i.e., to access the operating system without rebooting. Therefore, if a user issues a continue command in order to prevent the computer system from switching to the console state, the request to continue (restart) execution of the operating system is tested.

In a preferred embodiment, an On State Continuable Flag is contained in console communication memory 36. The On State Continuable Flag is accessed by both the ON functionality and the console functionality to indicate and determine whether a transition from the ON state to the console state can be prevented, if requested by the user. The state of this flag depends upon the timeout value supplied by the ON functionality, and upon whether execution of specified console functions by the console functionality precludes use of the saved context of the ON state to resume running of the operating system.

Typically, the computer system switches from the off state to the console state when the node is powered up via the front panel functionality. However, this transition also can result from the repair of a fault that prevented access to console functionality. A transition from console state to off state normally occurs when the computer system is powered down. In addition, the computer system enters the off state from the console state when a fault prevents access to console functionality.

The computer system can enter the off state directly from the ON state as a consequence of a power loss by the computer system, or as a result of a fault which prevents access to either ON functionality or console functionality. A transition from the off state to the ON state can only occur if a fault is corrected that previously prevented access to ON functionality, provided that the correction of the fault does not prevent the computer system from restarting execution of the operating system without rebooting.

The computer system can switch to the console state from the ON state under several circumstances. For example, a fatal hardware error that prevents continued running of the operating system, but which does not interfere with access to console functionality, will cause the computer system to switch to the console state.

Furthermore, the operating system itself may generate an On State Stop signal to obtain access to console functionality and/or to cause the computer system to enter the console state. When an On State Stop signal is provided by the operating system, the operating system may also set several parameters by setting a number of flags located in console communication memory 36. These flags are used in order to define the behavior of the computer system after console functionality is accessed.

The operating system may provide an On State Stop signal for a variety of reasons. For example, the operating system itself may request a switch to console state, a fatal software error may prevent continued execution of the operating system without rebooting, the main CPU may be executing a Halt instruction, or the operating system may detect a keep-alive failure (which indicates that a hang condition has been detected).

The computer system also can switch from the ON state to the console state in response to a reset request, i.e., a Force Console Access signal. The Force Console Access signal is generated by console client computer system 12 and transmitted on the standard network interconnection, or is provided by a local user interface.

As embodied in FIG. 1, a local user interface may be provided to the console functionality by coupling a serial line interface 38 to console bus 30, and by coupling an ASCII terminal 40 to the serial line interface. In existing console subsystems, a Force Console Access signal is provided when the Break key is depressed on a console terminal. The local user interface may be referred to as a local console client of console server computer system 10 because it allows access to console functionality. Unlike console client computer system 12, the local user interface does not add any other console functionality to the console functionality provided by console server computer system 10.

In accordance with an embodiment of the invention, the console server computer system determines whether a remote reset request is included in a data packet received by the computer system from the standard network interconnection. In response to receipt of the remote reset request, the console server computer system interrupts access to the operating system if the computer system is in the ON state. The remote reset request is generated and provided by a console client computer system in order to access the console functionality of the console server computer system.

Preferably, if the computer system determines that a remote reset request is included in a received data packet, a non-maskable interrupt is generated. As embodied in FIG. 1, network link attachment chip 34 in network adapter 32 tests data packets received on LAN/WAN link 14. If a remote reset request is included in a data packet, a non-maskable interrupt is directly sent to console CPU 18.

In the present invention, security information demonstrating authorization to obtain access to the console functionality of the computer system may be provided at times when a console function request is provided. The computer system will verify the security information prior to providing access to the console functionality of the computer system.

The consoles associated with computer systems allow complete control over the computer system. Therefore, these consoles need to be secured. Thus, in response to a Force Console Access signal, the computer system conducts a security check before providing access to console functionality. As shown in FIG. 1, security functionality software 42 is included in console memory 22. The security functionality software authenticates and authorizes the initiator of a Force Console Access signal. Access to the operating system is interrupted during the security checking. However, if the initiator fails to pass the security check, the computer system restarts execution of the operating system and continues in the ON state without rebooting the operating system. If the initiator passes the security check, however, access to console functionality is obtained.

Figure 2:
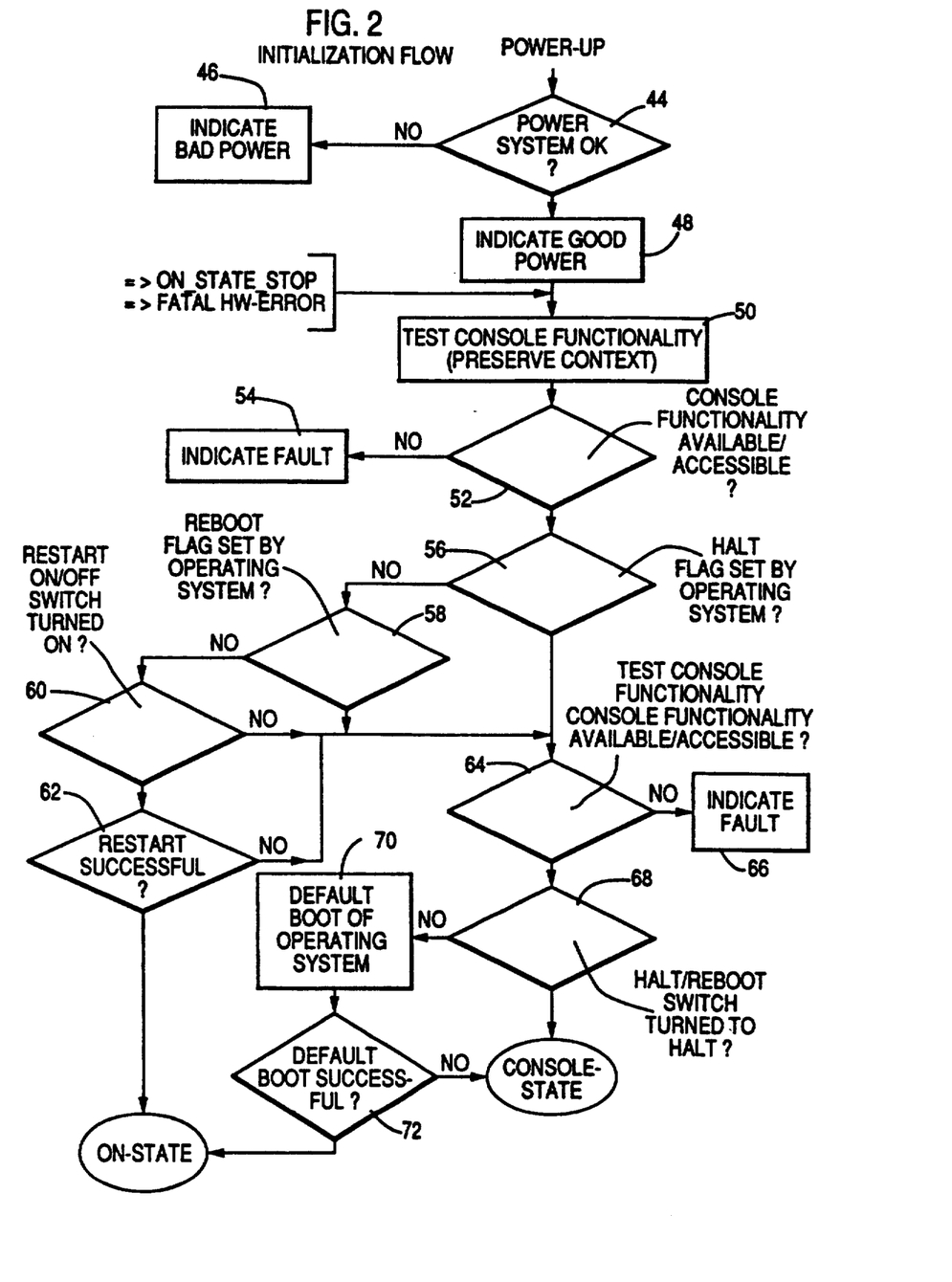
FIG. 2 is a flow chart illustrating the initialization of a computer system in accordance with a preferred embodiment of the present invention.

A flow chart illustrating the initialization of a computer system is shown in FIG. 2. Preferably, initialization of the computer system begins with power up. In step 44, the front panel functionality of the computer systems determines whether the power system is functional. If the power system is not functional, in step 46 an indication of bad power will be provided using the Power OK indicator light on front panel 28. If the power system is functional, in step 48 the Power OK indicator light will indicate good power.

In step 50, the front panel functionality tests the console functionality. During this test, previously stored data is saved in order to allow restarting of the operating system. As shown in FIG. 2, the testing in step 50 is also conducted when execution of the operating system is interrupted by a fatal hardware error or in response to the providing of an On State Stop signal by the operating system itself. In step 52, the front panel functionality indicates whether the console functionality is available and accessible. If not, in step 54, indicator lights on front panel 28 indicate a fault has occurred, and the computer system cannot enter the console state.

If console functionality is available, the initialization flow will depend upon the state of flags in console communication memory 36 that can be set by the operating system, and by the state of hardware switches on front panel 28 that are physically set by the user. In step 56, the state of the Halt flag will be examined. The Halt flag is set by the operating system to force the computer system to enter the console state by preventing restart of the operating system without rebooting. If the Halt flag is not set, in step 58 a Reboot flag is examined. The Reboot flag is set by the operating system to force a reboot of the operating system instead of a restart of the operating system.

As described previously, front panel 28 includes a Restart On/Off switch. In step 60, the state of the restart switch is examined. If the Restart switch is turned to On, the computer system attempts to restart execution of the operating system without rebooting the operating system. In step 62, a determination is made whether the restart was successful. If the operating system is successfully restarted, the computer system remains in the ON state and does not switch to the console state.

If the Halt flag or the Reboot flag is set by the operating system, or if the Restart switch is set to Off or an attempted restart is unsuccessful, additional testing of console functionality is performed in step 64. However, in this step, unlike step 50, there is no need to save stored data because there will be no attempt by a computer system in the ON state to continue in the ON state. If the additional testing indicates that the console functionality is not available or accessible, indicator lights on front panel 28 indicate that a fault has occurred in step 66. However, if the console functionality is available, the Halt/Reboot switch on front panel 28 is examined in step 68.

If the Halt/Reboot switch is turned to Halt, no attempt is made to boot the operating system, and the computer system enters or remains in the console state. If, however, the Halt/Reboot switch is turned to Reboot, the console functionality will attempt to boot the operating system in step 70. In step 72, a determination is made whether the operating system has been successfully booted. If not, the computer system remains in the console state. However, upon successful loading of the operating system, the computer system switches to the ON state.

Thus, the initialization flow for the computer system is entered when the computer system is powered up, or as a consequence of an On State Stop by the operating system or a fatal hardware error. The path taken during initialization is determined by the Halt and Reboot flags supplied by the operating system, and by the Restart On/Off switch and Halt/Reboot switch on the front panel.

Figure 3:
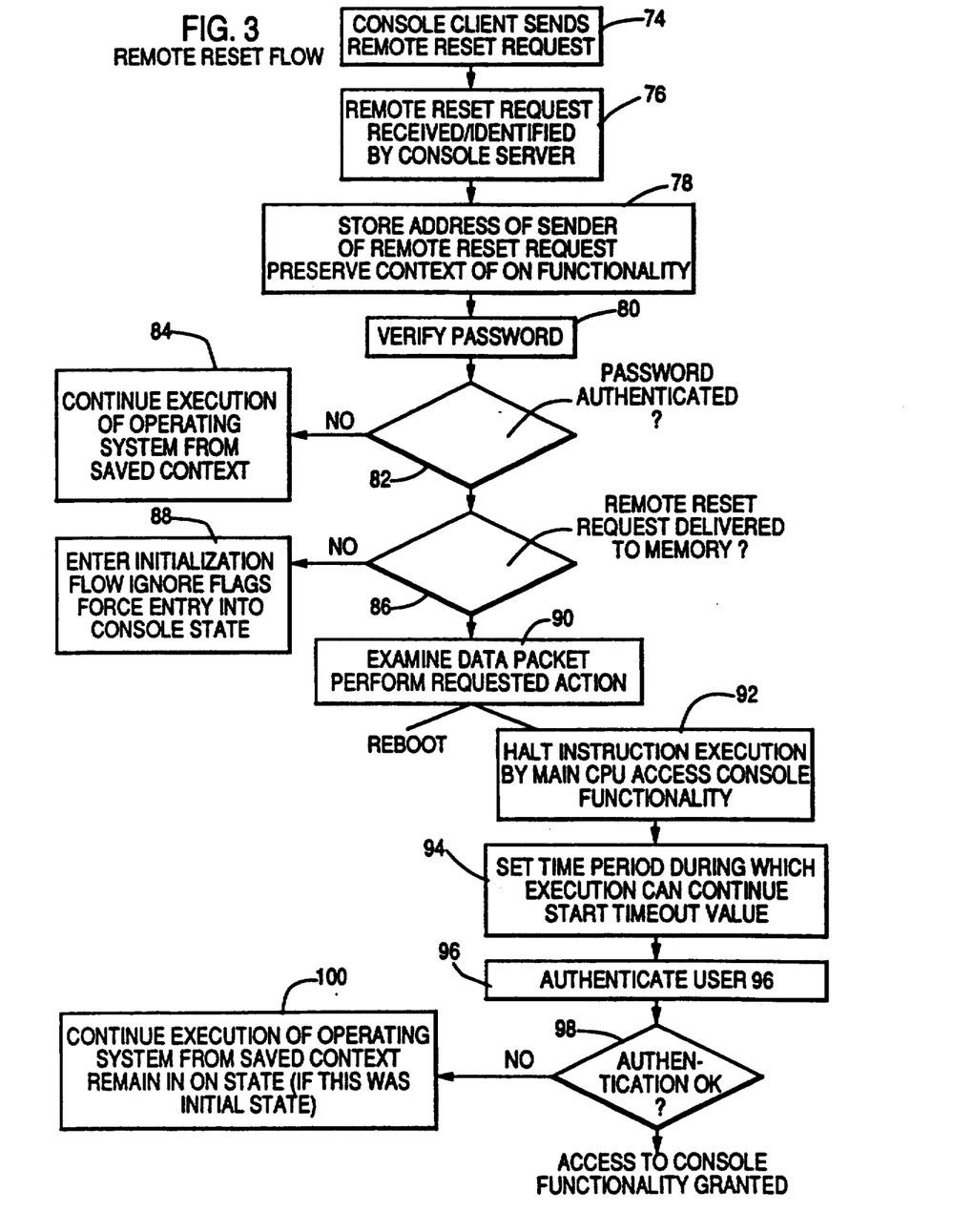
FIG. 3 is a flow chart illustrating the remote reset of a computer system in accordance with a preferred embodiment of the present invention.

In FIG. 3, a flow chart is shown illustrating remote reset of the computer system. A remote reset request is sent by console client computer system 12 across the network to request access to the console functionality of console server computer system 10, and also can be used to force a reboot of console server computer system 10.

As embodied in FIG. 3, the console client computer system sends a data packet including a remote reset request in step 74. The data packet containing the remote reset request is received and identified by the network link attachment chip 34 in step 76. In step 78, the address of the sender of the remote reset request is stored to allow later tracing to the initiator of the request should this be required for security reasons. Furthermore, stored data is saved to preserve the context of the ON functionality so that execution of the operating system can be continued without reboot if required. In step 80, network link attachment chip 34 verifies that a password which is part of the remote reset request is correct. If the remote reset request is not authenticated in step 82, then execution of the operating system is continued without reboot in step 84.

If the remote reset request is authorized, a determination is made whether the data packet that contained the remote reset request has been delivered to memory in step 86. If the data packet has not been stored in memory, the computer system is in a fault condition and it is unlikely that execution of the operating system can be continued. Therefore, in step 88 entry to the console state is forced. Once in the console state, console functionality can be used to determine the reason for the fault.

If the data packet has been successfully delivered to memory, the contents of the data packet are examined in step 90 and the requested action is performed. The data packet can be used to set or reset the Halt and Reboot flags, and can require that the console server computer system reboot the operating system. The data packet also can require that the console server computer system provide access to other console functionality. Access to this other console functionality is available in step 92. At this point, timeout and authorization checks are performed in a similar manner to those performed in response to requests for console functionality initiated by the operating system. In step 94, a timeout value is provided to set the time period during which execution of the operating system can be restarted without reboot. In step 96, authentication is performed. If the authentication is proper in step 98, access to console functionality is granted. If the request for console functionality cannot be authenticated, in step 100 the computer system can continue in the ON state because the context of the ON state was saved.

In a preferred embodiment of the invention, the console functionality of console server computer system 10 may be accessed from a local port for communication with the user and from a remote port for communication with console client computer system 12 over LAN/WAN link 14. Both the local access path and the remote access path are directly controlled by the console functionality.

All nodes in the network formed by link 14, including console server computer system 10 and console client computer system 12, contain software responsible for organizing and coordinating the flow of information between different nodes. Preferably, console memory 22 includes communications software 102. This software is dedicated to the mechanics of establishing a signal connection between different nodes, transmitting information between the nodes, and ending the connection when the information transmittal is complete.

In a preferred embodiment of the invention, communications software 102 in combination with network link attachment chip 34 in network adapter 32 operates according to one of a variety of communication protocols, such as Phase V of the Digital Network Architecture (DNA) of Digital Equipment Corporation or the Open Systems Interconnection (OSI) model of the International Standards Organization, both of which are well known in the art. The hardware layer of the OSI model, which includes the physical layer and the data link layer, may be implemented by network link attachment chip 34, which sends a non-maskable interrupt directly to console CPU 18 at times when a remote reset request is included in a data packet received on LAN/WAN link 14. The subnet level of the OSI model, which includes the network, transport, and session layers, and the presentation and application layers, may be implemented by communications software 102.

When console server computer system 10 is operating in the ON state, full network communication capabilities can be implemented. However, when console server computer system 10 is in the console state, the available resources for communication are more limited. Therefore, only the minimum capabilities of the communication protocol are implemented by communications software 102 and by the console functionality of console server computer system 10.

Preferably, console memory 22 also includes network support and access functionality software 104 to handle access to console functionality by a console client computer system on the network. A major part of the required network support functionality may be provided by the Maintenance Operations Protocol (MOP) of Digital Equipment Corporation. The Maintenance Operations Protocol interfaces directly between the console functionality of console server computer system 10 and the data link layer of the OSI model.

The Maintenance Operations Protocol for network support and access functionality software 104 provides functionality that allows execution of dump, load, loop, identification, read counter, and console carrier functions. The dump function transfers block data from console memory 22 or from main memory 20 to a destination node on the network, such as console client computer system 12. The load function transfers block data from a destination node on the network, such as console client computer system 12, to console memory 22 or to main memory 20. When executing the loop function, the Maintenance Operations Protocol will cause console server computer system 10 to receive and resend loop data that is sent by console client computer system 12. Console server computer system 10 performs the identification function by sending periodic identification messages into the network to allow configuration determination, and by supplying an identification response if console client computer system 12 requests an identification of console server computer system 10. Console server computer system 10 responds to a read counter request from console client computer system 12 by reading the requested data link counter and sending the requested count to the console client.

In a preferred embodiment of the invention, the Maintenance Operations Protocol also provides for the transport of data across the network in a character string format. Console server computer system 10 executes a console carrier function, after receiving a reservation sent by console client computer system 12, by receiving and sending strings of characters on the network. As an alternative to transfers of character string data, console function requests and responses may be transported across the network using a fully coded request and response protocol.

In order to request execution of a specified console function in a character string format, an operator enters English-language statements into ASCII terminal 40 coupled to serial line interface 38, or into a similar console terminal located at console client computer system 12. Console memory 22 includes user interface functionality software 106 to handle access to console functionality from a user on the local user interface.

Console commands in ASCII format, provided via the standard network interconnection or via the local user interface, then are converted into corresponding console function request codes. Preferably, function parser software 108 provides support for any access paths to the console functionality of console server computer system 10 that carry character string data. For example, function parser software 108 may parse console commands in ASCII format received from console client computer system 12 into corresponding console function request codes, and also may parse console function response codes into corresponding console responses in ASCII format to be sent to console client computer system 12.

As embodied herein, the architecture of the console server computer system allows only one access path to console functionality to be used at a time. Therefore, the computer system switches the access path to allow access via the ON functionality, via the standard network interconnection, or via the local user interface in response to an On State Stop signal from the operating system, a remote reset request (Force Console Access signal) from the console client computer system, or a Force Console Access (Break) signal from the user, respectively.

A Console Access switch on front panel 28 can be provided to control access to console functionality. Access to console functionality by the operating system is not prevented by the position of the Console Access switch on front panel 28. However, only one of the three available console access paths discussed above can be used at any one time.

If the Console Access switch is set to Secure, no access to console functionality is possible via a local user interface or via LAN/WAN link 14. If the switch is set to Local Enable, only the local access path to console functionality is enabled. If the switch is set to Remote Enable, only the remote access path to console functionality is enabled.

In order to request execution of a specified console function by console server computer system 10, console function request codes are supplied by console client computer system 12, and/or console commands are entered into a console terminal. Console CPU 18 executes the specified console function using console server functionality software 37.

A basic command language is used for console commands for most VAX ® computers of Digital Equipment Corporation.

The BOOT command initiates a bootstrap sequence to load the operating system, or standalone diagnostic software, into the console server computer system 10 from a specified device, such as a mass storage device. The CONTINUE command restarts the execution of a halted program by main CPU 16 at the address currently contained in the program counter. The DEPOSIT command enables data to be written into a specified memory location or register. The EXAMINE command enables the contents of a specified memory location or register to be read and displayed. The FIND command initiates a search of memory for 64 Kbytes of valid memory or for a restart parameter block. The HALT command stops main CPU 16 from executing macroinstructions after completing execution of the instruction in process when the command was entered. The INDIRECT command causes console CPU 18 to access a specified file and to begin executing console commands from the file. The INITIALIZE command initializes a processor to a specified condition by setting registers and counters to a specified state. The LOAD command is used to read or transfer data from a specified file to memory. The MICROSTEP command causes a processor to execute a specified number of microinstructions. The NEXT command is used to step a CPU clock to cause a processor to execute a specified number of macroinstructions. The REPEAT command causes a specified console command to be repeatedly executed and displayed. The SET command sets a specified console parameter to a specified value. The START command initializes main CPU 16, deposits an address in the program counter for main CPU 16, and issues a CONTINUE command to main CPU 16. The TEST command causes execution by console CPU 18 of a self-test program of the console subsystem. The UNJAM command clears fault conditions and initializes the system bus.

Additional console functions can be provided by using an extended version of console server functionality software 37.

In console server computer system 10, several console functions are accessible even when the computer system is accessing the operating system. Access by the ON functionality to this console functionality is provided via a procedural interface (vector of callable entrypoints).

For example, in implementations of console server computer system 10 in which character string data is carried on access paths to the console functionality, console functions may be executed by the ON functionality in order to read a character string from an active console access path or to write a character string to the active console access path.

Console functions that open, read, write, or close a block storage device also may be executed by the ON functionality. These routines are used during booting and dumping. The open routine is used to allow access to a disk by type, controller, and unit, to open a specified tape device, or to open the protocol layer of a specified network. The close routine is used to close access to a device. The write and read routines are used to respectively write logical blocks to a specified buffer from the device, and read logical blocks from the device to a specified buffer.

Console functions also are executed by the ON functionality at times when the operating system provides an On State Stop signal. When this routine is executed, a transition to console state occurs unless the Halt and Reboot flags are both reset and the Restart On/Off switch on the front panel is turned on. The Halt and Reboot flags can be supplied by the operating system to the console functionality when this procedure call is used.

The report function is a console function that provides an orderly mechanism for event reporting. This function is used for all reporting which is done by or via the console server functionality. Preferably, the event reporting provided by the console functionality of console server computer system 10 makes use of some of the capabilities of the Event Logging Architecture of Phase V of the Digital Network Architecture (DNA) of Digital Equipment Corporation.

The report function is used to report all console events, and also is used by the ON functionality of console server computer system 10 when it reports events via the console. Reports from the ON functionality will be channeled by the console server functionality to the remote access path or to the local access path. If no access path is available, reports from the ON functionality are stored in console memory 22 until they can be sent out on an active console access path.

Console functions also are executed by the ON functionality to implement procedures that allow the reading and writing of variables that are maintained by the console functionality. These console variables include boot parameters, boot flags, and data structure locations.

The ON functionality also can access the console functionality in order to cause a procedure to be performed that allows the ON functionality to obtain access to test functionality that is part of the console functionality. This procedure allows for transparent access to node-specific test functionality by the ON functionality.

It will be apparent to those skilled in the art that various modifications and variations can be made in the method of the present invention without departing from the scope or spirit of the invention. For example, various implementations of hardware and/or software can be used to provide access to console functionality and additional features can be provided, and communication can be performed over different types of networks. Thus, it is intended that the present invention cover the modifications and variations or this invention provided they come within the scope of the appended claims and their equivalents.

What is claimed is:

1. A method of providing access to the console functionality of a computer system in response to console function requests which comprises the following steps:
   switching the computer system from an off state to a console state;
   bootstrap loading the operating system of the computer system when the computer system is in the console state to switch the computer system to an ON state;
   accessing the operating system when the computer system is in the ON state;
   switching the computer system from the ON state to the console state, at times when the computer system is prevented from accessing the operating system without bootstrap loading the operating system;
   providing a console function request to request execution of a specified console function; and
   executing the specified console function, without accessing the operating system, both at times when the computer system is in the console state and at times when the computer system is in the ON state, in response to the providing of the console function request.

2. A method in accordance with claim 1, in which the step of switching the computer system from an off state to a console state includes powering up the computer system.

3. A method in accordance with claim 1, and further comprising:
   coupling the computer system to a standard network interconnection to receive data packets transferred on a network;
   determining whether a console function request requesting execution of a specified console function is included in a received data packet; and
   executing the specified console function, in response to the receipt of a data packet including the console function request.

4. A method in accordance with claim 1, and further comprising:
- determining whether a hardware error occurring when the computer system is in the ON state is an error that prevents access to the operating system without bootstrap loading the operating system; and
- switching the computer system from the ON state to the console state in response to an error that prevents access to the operating system without bootstrap loading the operating system.

5. A method in accordance with claim 1, and further comprising:
- determining whether a software error occurring when the computer system is in the ON state is an error that prevents access to the operating system without bootstrap loading the operating system; and
- switching the computer system from the ON state to the console state in response to an error that prevents access to the operating system without bootstrap loading the operating system.

6. A method in accordance with claim 1, and further comprising:
- testing the console functionality of the computer system to determine whether the computer system can execute console functions without error, prior to switching the computer system from an off state to a console state.

7. A method in accordance with claim 6, and further comprising:
- indicating a fault condition at times when testing of the console functionality of the computer system determines that the computer system cannot execute console functions without error.

8. A method in accordance with claim 1, and further comprising:
- providing security information demonstrating authorization to obtain access to the console functionality of the computer system at times when a console function request is provided; and
- verifying the security information prior to providing access to the console functionality of the computer system.

9. A method in accordance with claim 8, and further comprising:
- coupling the computer system to a standard network interconnection to receive data packets transferred on a network;
- determining whether a console function request requesting execution of a specified console function is included in a received data packet; and
- executing the specified console function, in response to the receipt of a data packet including the console function request.

10. A method in accordance with claim 1, and further comprising:
- interrupting access to the operating system, in response to the providing of a console function request when the computer system is in the ON state, to access the console functionality of the computer system; and
- continuing access to the operating system without bootstrap loading the operating system, after interrupting access to the operating system, and after the computer system executes a specified console function in response to the providing of the console function request when the computer system is in the ON state.

11. A method in accordance with claim 10, and further comprising:
- providing a continue command, after access to the operating system is interrupted, to cause access to the operating system to be continued.

12. A method in accordance with claim 10, and further comprising:
- coupling the computer system to a standard network interconnection to receive data packets transferred on a network;
- determining whether a console function request requesting execution of a specified console function is included in a received data packet; and
- executing the specified console function, in response to the receipt of a data packet including the console function request.

13. A method in accordance with claim 10, and further comprising:
- coupling the computer system to a standard network interconnection to receive data packets transferred on a network;
- determining whether a remote reset request is included in a received data packet; and
- interrupting access to the operating system, in response to the receipt of a data packet including the remote reset request when the computer system is in the ON state, to access the console functionality of the computer system.

14. A method in accordance with claim 13, and further comprising:
- generating a non-maskable interrupt in response to the receipt of a data packet including the remote reset request.

15. A method in accordance with claim 10, and further comprising:
- coupling the computer system to a standard network interconnection to receive data packets transferred on a network;
- determining whether a remote reset request is included in a received data packet;
- interrupting access to the operating system, in response to the receipt of a data packet including the remote reset request when the computer system is in the ON state, to access the console functionality of the computer system;
- determining whether a console function request requesting execution of a specified console function is included in the received data packet; and
- executing the specified console function, in response to the receipt of the data packet including the console function request.

16. A method in accordance with claim 15, and further comprising:
- generating a non-maskable interrupt in response to the receipt of a data packet including the remote reset request.

17. A method in accordance with claim 10, and further comprising:
- determining whether access to the operating system can be continued without bootstrap loading the operating system, prior to continuing access to the operating system.

18. A method in accordance with claim 17, and further comprising:
- switching the computer system from the ON state to the console state at times when execution of the specified console function will prevent access to the operating the system from being continued without bootstrap loading the operating system.

19. A method in accordance with claim 17, and further comprising:
specifying a timeout period during which access to the operating system can be continued at times when access to the operating system is interrupted to provide access to console functionality.

20. A method in accordance with claim 19, and further comprising:
switching the computer system from the ON state to the console state in response to the timeout period expiring prior to the continuing of access to the operating system.

21. A method in accordance with claim 20, and further comprising:
providing, prior to expiration of the timeout period, an indication that the computer system will switch from the ON state to the console state.

22. A method in accordance with claim 21, and further comprising:
providing a continue command, in response to the indication that the computer system will switch, to prevent switching of the computer system from the ON state to the console state.

23. A method in accordance with claim 17, and further comprising:
providing a continue command, after access to the operating system is interrupted, to cause access to the operating system to be continued.

24. A method in accordance with claim 18, and further comprising:
providing, prior to execution of the specified console function, an indication that the computer system will switch from the ON state to the console state.

25. A method in accordance with claim 24, and further comprising:
providing a continue command, in response to the indication that the computer system will switch, to prevent switching of the computer system from the ON state to the console state.

26. A method in accordance with claim 10, and further comprising:
providing security information demonstrating authorization to obtain access to the console functionality of the computer system at times when a console function request is provided; and
verifying the security information prior to providing access to the console functionality of the computer system.

27. A method in accordance with claim 26, and further comprising:
coupling the computer system to a standard network interconnection to receive data packets transferred on a network;
determining whether a console function request requesting execution of a specified console function is included in a received data packet; and
executing the specified console function, in response to the receipt of a data packet including the console function request.

28. A method in accordance with claim 26, and further comprising:
coupling the computer system to a standard network interconnection to receive data packets transferred on a network;
determining whether a remote reset request is included in a received data packet; and
interrupting access to the operating system, in response to the receipt of a data packet including the remote reset request when the computer system is in the ON state, to access the console functionality of the computer system.

29. A method in accordance with claim 28, and further comprising:
generating a non-maskable interrupt in response to the receipt of a data packet including the remote reset request.

30. A method in accordance with claim 26, and further comprising:
coupling the computer system to a standard network interconnection to receive data packets transferred on a network;
determining whether a remote reset request is included in a received data packet;
interrupting access to the operating system, in response to the receipt of a data packet including the remote reset request when the computer system is in the ON state, to access the console functionality of the computer system;
determining whether a console function request requesting execution of a specified console function is included in the received data packet; and
executing the specified console function, in response to the receipt of the data packet including the console function request.

31. A method in accordance with claim 30, and further comprising:
generating a non-maskable interrupt in response to the receipt of a data packet including the remote reset request.

32. A method of providing access to the console functionality of a console server computer system in response to console function requests of a console client computer system, wherein the console server computer system and the console client computer system are in a computer network and are coupled to a standard network interconnection for transferring data packets among a plurality of computer systems, the method comprising the following steps:
providing the console functionality of the console server computer system without accessing an operating system in response to console function requests, the steps performed by the console server computer system including:
coupling the console server computer system to the standard network interconnection to transmit and receive data packets on the network,
switching the console server computer system from an off state to a console state,
bootstrap loading the operating system when the console server computer system is in the console state to switch the console server computer system to an ON state,
accessing the operating system when the console server computer system is in the ON state,
switching the console server computer system from the ON state to the console state, at times when the console server computer system is prevented from accessing the operating system without bootstrap loading the operating system,
determining whether a console function request requesting execution of a specified console function is included in a data packet received by the console server computer system, and executing the specified console function, without accessing the operating system, at times when the console server computer system is in the console state and at times when the console server computer system is in the ON state, in response to the receipt of a data packet including the console function request; and managing the console server computer system from the console client computer system by accessing the console functionality of the console server computer system, the steps performed by the console client computer system including:

coupling the console client computer system to the standard network interconnection to transmit and receive data packets on the network, generating a console function request in order to request execution of a specified console function by the console server computer system, and generating a data packet including the console function request to be transmitted on the standard network interconnection.

33. A method in accordance with claim 32, in which:

the steps performed by the console client computer system further comprise generating a data packet including security information demonstrating authorization to obtain access to the console functionality of the console server computer system; and the steps performed by the console server computer system further comprise verifying the security information included in a data packet received by the console server computer system prior to providing access to the console functionality of the computer system.

34. A method in accordance with claim 32, and further comprising the following steps performed by the console server computer system:

interrupting access to the operating system, in response to the providing of a console function request when the console server computer system is in the ON state, to access the console functionality of the console server computer system; and continuing access to the operating system without bootstrap loading the operating system, after interrupting access to the operating system, and after the console server computer system executes a specified console function in response to the providing of the console function request when the console server computer system is in ,the ON state.

35. A method in accordance with claim 34, in which:

the steps performed by the console server computer system further comprise:

determining whether a remote reset request is included in a data packet received by the console server computer system, and interrupting access to the operating system, in response to the receipt of a data packet including the remote reset request when the console server computer system is in the ON state; and the steps performed by the console client computer system further comprise:

generating a remote reset request in order to access the console functionality of the console server computer system, and generating a data packet including the remote reset request to be transmitted on the standard network interconnection.

36. A method in accordance with claim 35, in which the steps performed by the console server computer system further comprise:

rebooting the operating system in response to the receipt of a data packet including the remote reset request.

37. A method in accordance with claim 34, in which:

the steps performed by the console client computer system further comprise generating a data packet including security information demonstrating authorization to obtain access to the console functionality of the console server computer system; and the steps performed by the console server computer system further comprise verifying the security information included in a data packet received by the console server computer system prior to providing access to the console functionality of the computer system.

38. A method in accordance with claim 35, in which the steps performed by the console server computer system further comprise:

generating a non-maskable interrupt in response to the receipt of a data packet including the remote reset request.

39. A method in accordance with claim 32, in which:

the steps performed by the console server computer system further comprise:

determining whether a remote reset request is included in a data packet received by the console server computer system, and interrupting access to the operating system, in response to the receipt of a data packet including the remote reset request when the console server computer system is in the ON state; and the steps performed by the console client computer system further comprise:

generating a remote reset request in order to access the console functidnality of the console server computer system, and generating a data packet including the remote reset request to be transmitted on the standard network interconnection.

40. A method in accordance with claim 39, in which the steps performed by the console server computer system further comprise:

rebooting the operating system in response to the receipt of a data packet including the remote reset request.

41. A method in accordance with claim 40, in which:

the steps performed by the console client computer system further comprise generating a data packet including security information demonstrating authorization to obtain access to the console functionality of the console server computer system; and the steps performed by the console server computer system further comprise verifying the security information included in a data packet received by the console server computer system prior to providing access to the console functionality of the computer system.

42. A method in accordance with claim 39, in which the steps performed by the console server computer system further comprise:

generating a non-maskable interrupt in response to the receipt of a data packet including the remote reset request.

43. A method in accordance with claim 39, in which:

the steps performed by the console client computer system further comprise generating a data packet including security information demonstrating authorization to obtain access to the console functionality of the console server computer system; and
the steps performed by the console server computer system further comprise verifying the security information included in a data packet received by the console server computer system prior to providing access to the console functionality of the computer system.

* * * * *